(12) United States Patent
Yang et al.

(10) Patent No.: US 8,432,328 B2
(45) Date of Patent: Apr. 30, 2013

(54) HOUSING AND METHOD FOR MANUFACTURING THE SAME

(75) Inventors: Zhi-Jun Yang, Shenzhen (CN); Mei-Wen Fu, Shenzhen (CN); Zhan Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 457 days.

(21) Appl. No.: 12/765,427

(22) Filed: Apr. 22, 2010

(65) Prior Publication Data

US 2011/0134015 A1 Jun. 9, 2011

(30) Foreign Application Priority Data

Dec. 8, 2009 (CN) .......................... 2009 1 0311056

(51) Int. Cl.
*H01Q 1/38* (2006.01)
(52) U.S. Cl.
USPC ......................................................... 343/878

(58) Field of Classification Search ................. 343/878, 343/702, 873; 29/600
See application file for complete search history.

(56) References Cited

U.S. PATENT DOCUMENTS

| | | | |
|---|---|---|---|
| 7,775,446 B2* | 8/2010 | Ochi et al. | 235/492 |
| 8,031,127 B2* | 10/2011 | Ochi et al. | 343/788 |
| 2008/0303735 A1* | 12/2008 | Fujimoto et al. | 343/787 |
| 2009/0040734 A1* | 2/2009 | Ochi et al. | 361/737 |
| 2009/0051606 A1* | 2/2009 | Ochi et al. | 343/702 |
| 2009/0322624 A1* | 12/2009 | Hong et al. | 343/702 |

* cited by examiner

*Primary Examiner* — Huedung Mancuso
(74) *Attorney, Agent, or Firm* — Altis Law Group, Inc.

(57) ABSTRACT

A housing includes an antenna module having a carrier and a main body. The antenna module includes a first carrier portion, a second carrier portion attached to the first carrier portion, and an antenna coating the second carrier portion. The main body is molded to the antenna module and partially covering the antenna, such that the antenna is partially exposed from the main body to form a terminal. Also provided is a method for manufacturing the housing.

13 Claims, 3 Drawing Sheets

HOUSING AND METHOD FOR MANUFACTURING THE SAME

BACKGROUND

1. Technical Field

The present disclosure relates to device housings, and particularly to a housing used in electronic devices and a method for manufacturing the housing.

2. Description of Related Art

Portable electronic devices, such as mobile phones, personal digital assistants (PDAs) and laptop computers are widely used. Most utilize antenna modules for receiving and sending wireless signals. A commonly used antenna module includes a carrier and an antenna layer attached on the carrier.

However, the antenna layer may be exposed from the carrier and therefore, may be easily damaged. Thus, the performance of the antenna modules may be influenced.

Therefore, there is room for improvement within the art.

BRIEF DESCRIPTION OF THE DRAWINGS

Many aspects of a housing and method for manufacturing the housing can be better understood with reference to the following drawings. The components in the drawings are not necessarily to scale, the emphasis instead being placed upon clearly illustrating the housing and method for manufacturing the housing. Moreover, in the drawings, like reference numerals designate corresponding parts throughout the several views.

DETAILED DESCRIPTION

Figure 1:
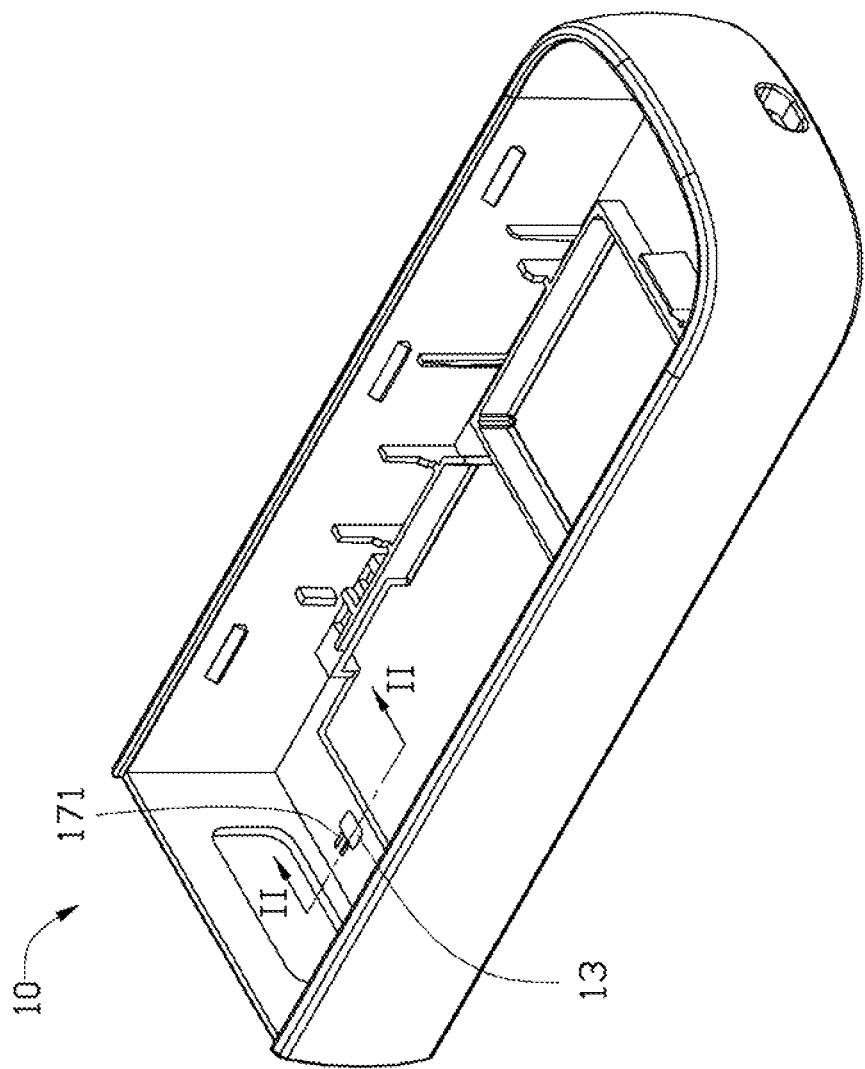
FIG. 1 is an isometric view of an exemplary housing used in an electronic device.

FIG. 1 shows an exemplary housing 10 for an electronic device, such as a mobile phone, a personal digital assistant, or other device.

Figure 2:
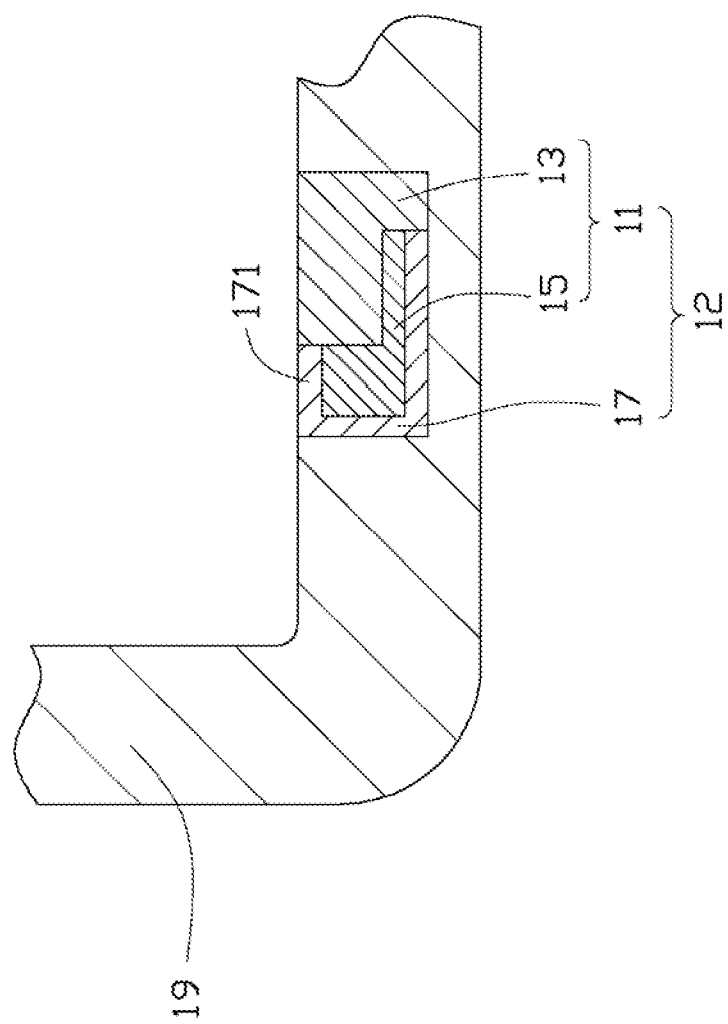
FIG. 2 is a cross-section of the housing of FIG. 1 taken along line II-II.

Referring to FIG. 2, the housing 10 includes a main body 19 and an antenna module 12 molded to the main body 19. The antenna module 12 includes a carrier 11 and an antenna 17 attached to the carrier 11.

The carrier 11 is formed by double shot molding, and includes a first carrier portion 13 and a second carrier portion 15 attached to the first carrier portion 13. The first carrier portion 13 is polycarbonate (PC) to form a non-plating zone. The first carrier portion 13 has good impact resistance, and is attached to the main body 19. The second carrier portion 15 is acrylonitrile-butadiene-styrene (ABS) or polypropylene (PP) to form a plating zone. The injection-molding temperature of the second carrier portion 15 is lower than that of the first carrier portion 13. The second carrier portion 15 provides strength.

The antenna 17 is a plating layer coated on a portion of the second carrier portion 15 and at least partially exposed from the main body 19 to form a terminal 171. The plating layer, according to an exemplary embodiment, includes a copper layer, a nickel layer, and a gold layer coating the second carrier portion 15, for example, in that order. The copper layer is configured for transmitting/receiving wireless signals. The nickel layer has an antioxidant effect for protecting the copper layer. The gold layer has high conductive properties to enhance stability of the antenna 17. The main body 19 can be made of plastic, such as polyethylene (PE) or poly vinyl chloride (PVC). The injection-molding temperature of the main body 19 is lower than the injection-molding temperature of the second carrier portion 15. The main body 19 can partially surround the antenna module 12 to form the housing 10.

Figure 3:
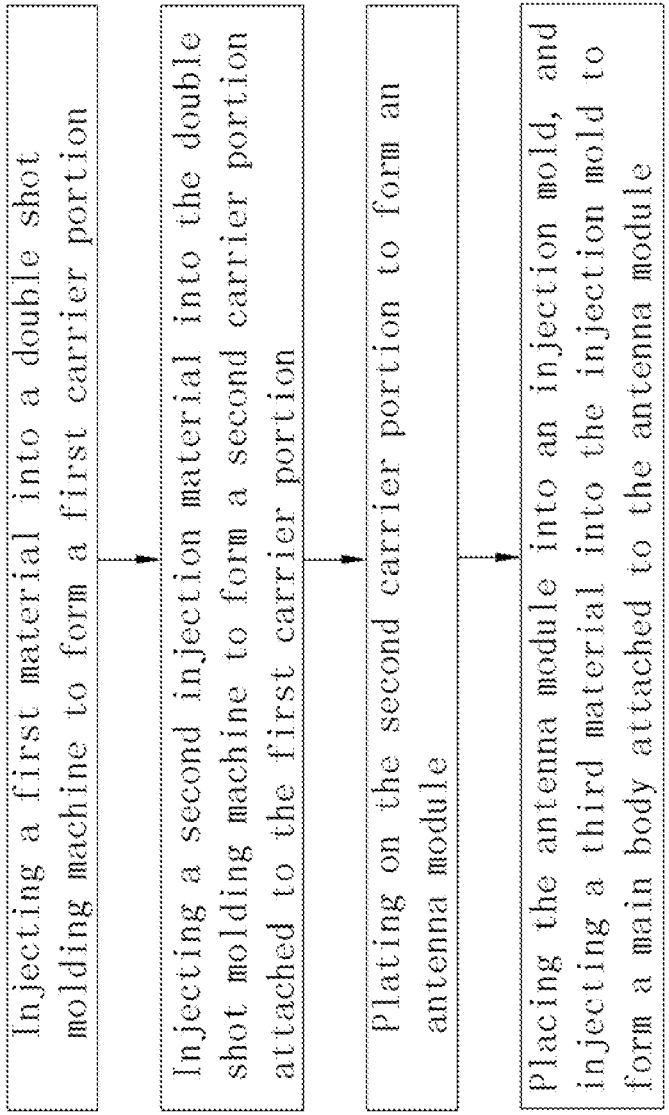
FIG. 3 is a flowchart showing a method of manufacturing an electronic device housing, such as, for example, that of FIG. 1.

Referring to FIG. 3, an exemplary embodiment of a method for manufacturing the housing 10 may comprise the following steps:

A double shot molding machine includes a first chamber and a second chamber facing the first chamber. The second chamber has a configuration the same as that of the antenna 17. Polycarbonate is injected into the first chamber to form the first carrier portion 13. The first carrier portion 13 is situated in the second chamber. The acrylonitrile-butadiene-styrene or polypropylene is injected into the second chamber to form the second carrier portion 15 attached to the first carrier portion 13. Thus, the carrier 11 is formed. The antenna 17 is formed on the second carrier portion 15 by plating, such as laser direct structuring (LDS). Thus, the antenna module 12 is formed.

An injection mold is provided. The injection mold includes a third chamber. The antenna module 12 is situated in the third chamber. Molten plastic is injected into the third chamber to form the main body 19 attached to a side of the antenna module 12, partially covering the antenna 17. The housing 10 is thus formed. The plastic can be polyethylene or poly vinyl chloride. A part of the antenna 17 exposed from the main body 19 to form the terminal 171.

The antenna module 12 is embedded in the housing 10, which can protect the antenna module 12. In addition, since the antenna module 12 can be assembled in the housing 10, operational efficiency is increased.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing comprising:
  an antenna module comprising:
    a carrier comprising:
      a first carrier portion and a second carrier portion molded to the first carrier portion and in directly contact with the first carrier portion, the first carrier portion molded from a plastic material incapable of being plated, and the second carrier portion molded from a plastic material capable of being plated;
    an antenna coated on a portion of the second carrier portion; and
  a main body molded to the antenna module and partially covering the antenna, such that an uncovered portion of the antenna is exposed for use as a terminal.

2. The housing as claimed in claim 1, wherein the second carrier portion is molded to the first carrier portion by double shot molding.

3. The housing as claimed in claim 2, wherein an injection-molding temperature of the second carrier portion is lower than an injection-molding temperature of the first carrier portion.

4. The housing as claimed in claim 3, wherein an injection-molding temperature of the main body is lower than the injection-molding temperature of the second carrier portion.

5. The housing as claimed in claim 1, wherein the first carrier portion is made of polycarbonate.

6. The housing as claimed in claim 1, wherein the second carrier portion is made of acrylonitrile-butadiene-styrene or polypropylene.

7. The housing as claimed in claim 1, wherein the main body is made of polyethylene or poly vinyl chloride.

8. A method for manufacturing a housing, comprising:
injecting a first injection material into a double shot molding machine to form a first carrier portion, the first injection material incapable of being plated;
injecting a second injection material into the double shot molding machine to form a second carrier portion attached to the first carrier portion and in directly contact with the first carrier portion, the second injection material capable of being plated;
plating an antenna on a portion of the second carrier portion to form an antenna module; and
situating the antenna module into an injection mold and injecting a third material into the injection mold to form a main body attached to the antenna module.

9. The method for manufacturing a housing as claimed in claim 8, wherein the double shot molding machine comprises a first chamber and a second chamber facing the first chamber, the first injection material is injected into the first chamber and the second injection material is injected into the second chamber.

10. The method for manufacturing a housing as claimed in claim 9, wherein an injection-molding temperature of the second injection material is lower than an injection-molding temperature of the first injection material.

11. The method for manufacturing a housing as claimed in claim 8, wherein a portion of the antenna not covered by the main body is exposed for use as a terminal.

12. The method for manufacturing a housing as claimed in claim 8, wherein an injection-molding temperature of the third material is lower than the injection-molding temperature of the second material.

13. The method for manufacturing a housing as claimed in claim 8, wherein the injection mold comprises a third chamber in which the antenna module is situated with the main body partially covering the antenna module.

\* \* \* \* \*